United States Patent Office 3,206,488
Patented Sept. 14, 1965

3,206,488
ORGANOTIN COMPOUNDS CONTAINING A MERCAPTO GROUP AND A METHOD OF PREPARING THEM
Walter A. Stamm, Dobbs Ferry, N.Y., assignor to Stauffer Chemical Company, New York, N.Y., a corporation of Delaware
No Drawing. Filed Feb. 26, 1962, Ser. No. 175,826
6 Claims. (Cl. 260—429.7)

This invention relates to organometallic compounds wherein the organometallic element is tetravalent silicon, tin or germanium. More particularly, the invention is concerned with organometallic compounds of the aforenamed type characterized by the presence of a mercaptoalkyl group and to a method of preparing them.

The compounds of the present invention can be represented by the following general formula:

(I) $(R)_n-M-[(L)_{m-1}-CHR_1-CH_2SH]_p$ wherein R is an alkyl radical of from 1 to 12 carbon atoms as exemplified by methyl, ethyl, isopropyl, n-butyl, sec.-amyl, n-amyl, n-hexyl, n-heptyl, n-octyl, isooctyl, decyl and dodecyl or a phenyl radical; $R_1$ is hydrogen or a radical as above defined for R; M designates an amphoteric element having a valence of four as represented by silicon, tin and germanium; L stands for phenylene or an alkylene chain which may be interrupted by phenylene; m is a whole number ranging from 1 to 11 which designates the number of methylene groups in the aforesaid alkylene chain it being understood that m is always equal to 2 when L signifies phenylene; n is a whole number of from 2 to 3 and p is a whole number from 1 to 2.

Organometallic compounds falling within the ambit of the above depicted formula include the following specific structures:

COMPOUND 1
$(H_3C)_3-Si-CH_2CH_2SH$

COMPOUND 2
$(H_3C)_3-Si-CH_2CH_2CH_2SH$

COMPOUND 3
$(H_5C_2)_2-Si-(C_2H_4SH)_2$

COMPOUND 4
$(H_5C_2)_3-Si-CH_2CH_2SH$

COMPOUND 5
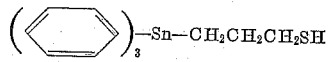

COMPOUND 6
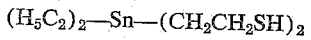

COMPOUND 7
$(H_{13}C_6)_3-Si-CH_2CH_2SH$

COMPOUND 8
$(H_3C)_3-Si-(CH_2)_7-CH_2CH_2SH$

COMPOUND 9
$(H_5C_2)_3-Sn-CH_2CH_2CH_2SH$

COMPOUND 10
$(n-H_9C_4)_3-Sn-CH_2CH_2CH_2SH$

COMPOUND 11
$(H_{17}C_8)_3-Sn-CH_2CH_2SH$

COMPOUND 12
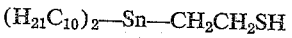

COMPOUND 13
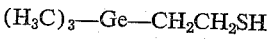

COMPOUND 14
$(H_5C_2)_2-Sn-(CH_2CH_2SH)_2$

COMPOUND 15
$(H_{21}C_{10})_2-Sn-CH_2CH_2SH$

COMPOUND 16
$(H_3C)_3-Ge-CH_2CH_2SH$

COMPOUND 17
$(H_5C_2)_2-Ge-(CH_2CH_2CH_2SH)_2$

COMPOUND 18
$(H_{17}C_8)_3-Ge-CH_2CH_2SH$

COMPOUND 19
$(n-H_9C_4)_3-Sn-(CH_2)_7-CH_2CH_2SH$

COMPOUND 20
$(H_{17}C_8)_3-Si-CH_2CH_2CH_2SH$

COMPOUND 21
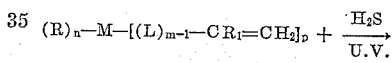

The heretofore unknown organometallic derivatives as described herein were discovered as the products of a new and novel chemical process wherein hydrogen sulfide, in the presence of actinic radiation such as U.V.-light, is added to the double bonds in an olefinic, terminally unsaturated organometallic compound. The reaction is illustrated schematically in the chemical equation below (II) $(R)_n-M-[(L)_{m-1}-CR_1=CH_2]_p + \xrightarrow[U.V.]{H_2S}$ (I) $(R)_n-M-[(L)_{m-1}-CHR_1-CH_2SH]_p$ wherein R, $R_1$, L, M, n, m, and p have the significance as previously given.

In general, I have found that excellent results are achieved when the olefinic, terminally unsaturated organometallic compound is contacted with an excess of hydrogen sulfide in the presence of actinic radiation, e.g., U.V. light, visible light and the like, while maintaining the temperature in the range from about —100° C. to below about 25° C. The hydrogen sulfide addition can be conveniently carried out in a relatively inert organic solvent which is liquid under the reaction conditions and in this connection reference is made to the lower saturated aliphatic hydrocarbons such as pentane, hexane and the like. The use of a solvent is further advantageous in that it tends to minimize the formation of sulfide by-products. In some instances the reaction is facilitated by the use of certain auxiliary materials such as U.V. absorbers and in this connection acetone has been found efficacious. However, these adjuncts are not essential to the performance of the basic reaction.

The unsaturated organometallic compounds of Formula II which constitute the starting materials for the process of the invention, are known chemical intermediates, the description and synthesis of which can be found in the technical literature. In general they can be prepared by reacting the requisite unsaturated organomagnesium halide with the appropriate halide of tin, silicon or germanium whereby is produced an organometallic derivative of the aforesaid metals having at least one unsaturated group. Some of the unsaturated organometallic intermediate compounds are available commercially such as the relatively simple allyl and vinyl derivatives.

The organometallic mercaptans as contemplated herein constitute a new class of chemical compounds possessing a high degree of utility. They are, for instance, valuable intermediates which can be further transformed into other useful products. The mercapto function undergoes esterification with carboxylic acids to produce a thioester grouping. Many of the compounds of the invention exhibit marked biocidal properties. Thus, compound 2 possesses fungicidal activity whereas compound 1 is effective against both fungus and insects. The organotin mercaptans are likewise biocidally active compounds and in addition are useful as antioxidants, particularly in plastic and rubber formulations. Compound 10 is an example of an organotin mercaptan especially suited for the above described purpose.

The compounds and procedures embodying the present invention will become more apparent from the following examples. It is to be understood, however, that the examples are presented for illustrative purposes only and that variations in practicing the invention without departing from the scope or spirit thereof will be apparent to those skilled in the art to which the said invention pertains.

EXAMPLE 1

γ-Thiolpropyl-tri-n-butyltin

$(n-C_4H_9)_3SnCH_2CH_2CH_2SH$

A double-wall Vycor (or quartz) well was inserted into the center-neck of a graduated 250 cc. three-necked reaction flask, which was equipped with a gas inlet tube leading to the bottom of the flask and an outlet at the top leading through a drying tube to a hydrogen sulfide scrubber. The flask was charged with 30 g. of allyltributyltin mixed with 50 cc. of pentane and 1.5 cc. of acetone as the catalyst. This solution was cooled to −70° C. by a Dry Ice-acetone bath. Then pure, dry hydrogen sulfide was bubbled into this mixture until its volume had increased by approximately 20 cc.

A 100-watt Hanovia high-pressure, quartz mercury vapor lamp was switched on and then introduced into the Vycor well. Heat transfer was minimized by pulling a high vacuum between the walls of the double wall well. The U.V. irradiation was continued for 3 hours at −70° to −60° C. Then the mixture was slowly warmed to room temperature, while allowing the hydrogen sulfide to evaporate into the scrubber. Pentane was removed at reduced pressure and the remaining oil distilled twice in vacuo using a 12″ column. A clear, colorless oil was obtained in approximately 60% yield; B.P. 90°/0.1 mm.; $n_D^{25}$ 1.505.

EXAMPLE 2

γ-Thiolpropyl-trimethylsilane

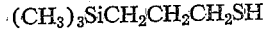
$(CH_3)_3SiCH_2CH_2CH_2SH$

The apparatus used for this procedure was the same as the one used in the preceding process for mercaptopropyltributyltin.

The reaction flask was charged with a mixture of 50 g. of allyltrimethylsilane, 1.5 g. of ethyl acetate (catalyst) and 60 cc. of pentane. Hydrogen sulfide was bubbled through this solution at −70° C. until it had increased the total volume of liquid by approximately 40 cc. It then was irradiated with U.V. light for 3 hours keeping the bath at −75° C.

After evaporating the excess hydrogen sulfide and pentane the crude material was distilled through a Vigreux column at reduced pressure. A colorless liquid was collected in 76% yield; B.P. 54°/16 mm.; $n_D^{27}$ 1.465.

EXAMPLE 3

β-Thiolethyl-trimethylsilane

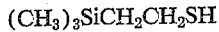
$(CH_3)_3SiCH_2CH_2SH$

In a Vycor reactor 50 g. of vinyltrimethylsilane was mixed with 1.5 g. of ethylacetate and 100 cc. of pentane. The reactor was cooled to −75° C. and approximately 40 cc. of liquid hydrogen sulfide was distilled into this pentane solution. The mixture was irradiated for a period of 3 hours by U.V. light as described in Example 1. The reaction mixture was subjected to fractional distillation. The purified product was obtained in 50% yield; B.P. 41°/18 mm.; $n_D^{25}$ 1.451.

Elemental analyses and I.R.-spectra confirmed the proposed structures in the above described examples.

I claim:

1. An organotin compound characterized by the presence of at least one alkyl group of not less than 2 carbon atoms and terminally substituted by —SH said compound being represented by the following general formula:

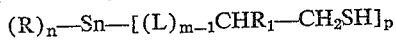
$(R)_n—Sn—[(L)_{m-1}CHR_1—CH_2SH]_p$ wherein R is selected from the class consisting of an alkyl radical of from 1 to 12 carbon atoms and a phenyl radical; $R_1$ is selected from the class consisting of hydrogen and an alkyl radical of from 1 to 12 carbon atoms; L is selected from the class consisting of phenylene and an alkylene chain which can be interrupted by phenylene; m is a whole number of from 1 to 11 which designates the number of methylene groups in the alkylene chain, said m always being 2 when L is phenylene; n is a whole number of from 2 to 3 and p is a whole number of from 1 to 2, the sum of n and p being 4.

2. An organometallic compound of the formula:

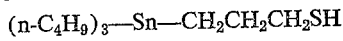
$(n-C_4H_9)_3—Sn—CH_2CH_2CH_2SH$

3. The method of preparing an organotin compound characterized by the presence of at least one alkyl group of not less than 2 carbon atoms and terminally substituted by —SH said compound being represented by the following general formula:

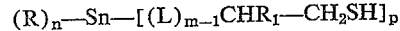
$(R)_n—Sn—[(L)_{m-1}CHR_1—CH_2SH]_p$ wherein R is selected from the class consisting of an alkyl radical of from 1 to 12 carbon atoms and a phenyl radical; $R_1$ is selected from the class consisting of hydrogen and an alkyl radical of from 1 to 12 carbon atoms; L is selected from the class consisting of phenylene and an alkylene chain which can be interrupted by phenylene; m is a whole number of from 1 to 11 which designates the number of methylene groups in the alkylene chain said m always being 2 when L is phenylene; n is a whole number of from 2 to 3 and p is a whole number of from 1 to 2, the sum of n and p being 4, which comprises reacting at a temperature ranging from about −100° C. to below about −60° C. and in the presence of actinic radiation excess hydrogen sulfide with an olefinic, terminally unsaturated organometallic compound of the following general formula:

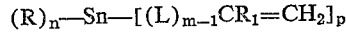
$(R)_n—Sn—[(L)_{m-1}CR_1=CH_2]_p$ wherein R, $R_1$, L, n, m and p have the values as above set forth.

4. The process according to claim 3 wherein the reaction is carried out in the presence of a liquid saturated hydrocarbon solvent.

5. The process according to claim 4 wherein the solvent is pentane.

6. The process according to claim 3 wherein the actinic radiation is U.V.-light.

References Cited by the Examiner

FOREIGN PATENTS 1,000,817  1/57  Germany.

OTHER REFERENCES

Noltes et al.: Chemistry and Industry (London), 1959, p. 294.

TOBIAS E. LEVOW, Primary Examiner.